US010310978B2

(12) United States Patent
Blankenship et al.

(10) Patent No.: US 10,310,978 B2
(45) Date of Patent: Jun. 4, 2019

(54) APPARATUS AND METHOD FOR MULTI-LEVEL CACHE REQUEST TRACKING

(71) Applicant: Intel Corporation, Santa Clara, CA (US)

(72) Inventors: Robert G. Blankenship, Tacoma, WA (US); Samantika S. Sury, Westford, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/721,499

(22) Filed: Sep. 29, 2017

(65) Prior Publication Data

US 2019/0102300 A1   Apr. 4, 2019

(51) Int. Cl.
*G06F 13/00* (2006.01)
*G06F 12/0815* (2016.01)
*G06F 12/0811* (2016.01)
*G06F 12/0875* (2016.01)

(52) U.S. Cl.
CPC ...... *G06F 12/0815* (2013.01); *G06F 12/0811* (2013.01); *G06F 12/0875* (2013.01); *G06F 2212/452* (2013.01); *G06F 2212/60* (2013.01); *G06F 2212/621* (2013.01)

(58) Field of Classification Search
CPC ............. G06F 12/0815; G06F 12/0875; G06F 12/0811; G06F 2212/60; G06F 2212/621; G06F 2212/452
USPC ......................................... 711/118, 144, 145
See application file for complete search history.

(56) References Cited

U.S. PATENT DOCUMENTS

| 9,864,694 B2 * | 1/2018 | Dooley ............... G06F 12/0864 |
| 2013/0326147 A1 | 12/2013 | Steely, Jr. et al. |
| 2014/0075120 A1 * | 3/2014 | Collura ............... G06F 12/0811 711/122 |
| 2014/0189251 A1 | 7/2014 | Steely |

(Continued)

OTHER PUBLICATIONS

International Search Report and Written Opinion for Application No. PCT/US2018/047647, dated Dec. 5, 2018, 9 pages.

*Primary Examiner* — Hong C Kim
(74) *Attorney, Agent, or Firm* — Nicholson De Vos Webster & Elliott LLP

(57) ABSTRACT

An apparatus and method for multi-level cache request tracking. For example, one embodiment of a processor comprises: one or more cores to execute instructions and process data; a memory subsystem comprising a system memory and a multi-level cache hierarchy; a primary tracker to store a first entry associated with a memory request to transfer a cache line from the system memory or a first cache within the cache hierarchy to a second cache; primary tracker allocation circuitry to allocate and deallocate entries within the primary tracker; a secondary tracker to store a second entry associated with the memory request; secondary tracker allocation circuitry to allocate and deallocate entries within the secondary tracker; the primary tracker allocation circuitry to deallocate the first entry in response to a first indication that one or more cache coherence requirements associated with the cache line have been resolved, the secondary tracker allocation circuitry to deallocate the second entry in response to a second indication related to transmission of the cache line to the second cache.

20 Claims, 16 Drawing Sheets

(56) References Cited

U.S. PATENT DOCUMENTS

| | | | |
|---|---|---|---|
| 2014/0281251 A1* | 9/2014 | Zhang | G06F 12/0891 |
| | | | 711/133 |
| 2016/0092366 A1 | 3/2016 | Pal et al. | |
| 2016/0170880 A1 | 6/2016 | Steely | |
| 2016/0188471 A1 | 6/2016 | Forrest et al. | |
| 2017/0286285 A1* | 10/2017 | Berke | G06F 12/0804 |
| 2017/0322884 A1* | 11/2017 | Gschwind | G06F 12/0804 |
| 2018/0039577 A1* | 2/2018 | Chadha | G06F 12/0804 |
| 2018/0189180 A1* | 7/2018 | Fahim | G06F 12/0833 |

\* cited by examiner

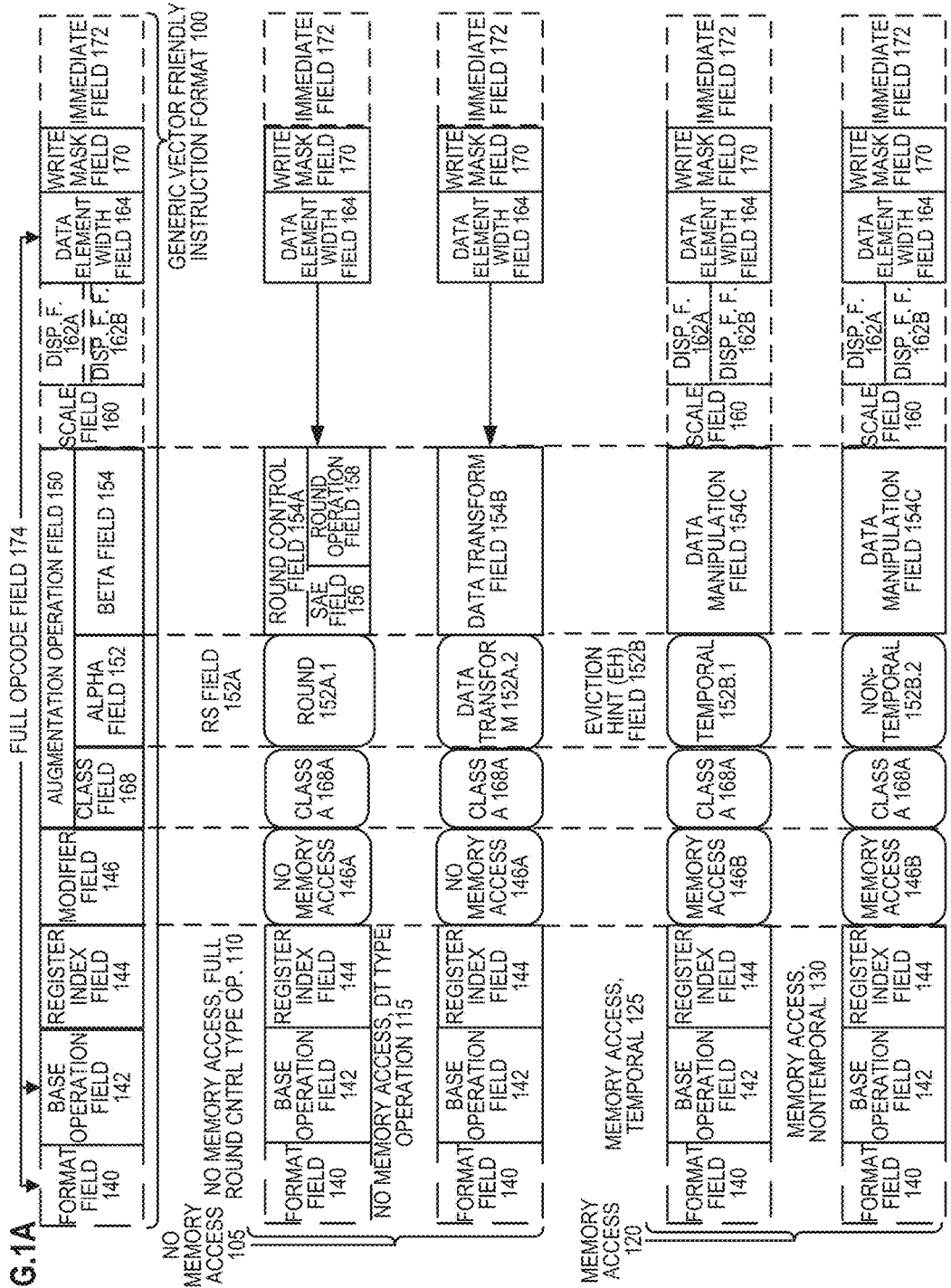

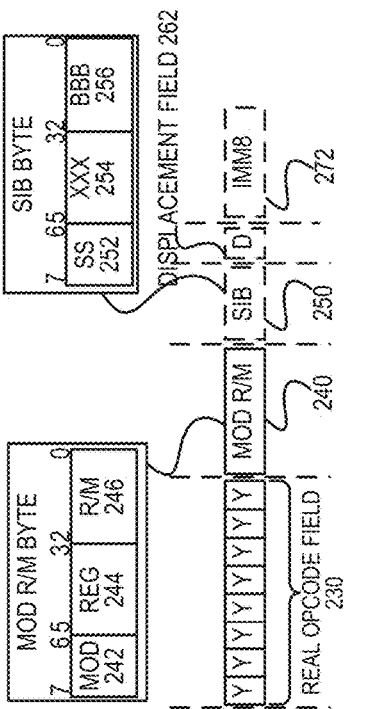
FIG. 2A
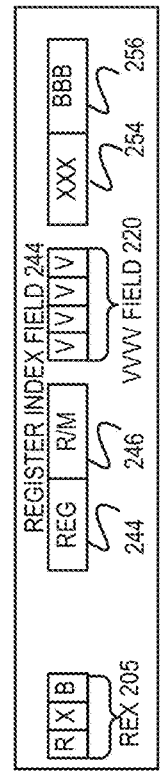
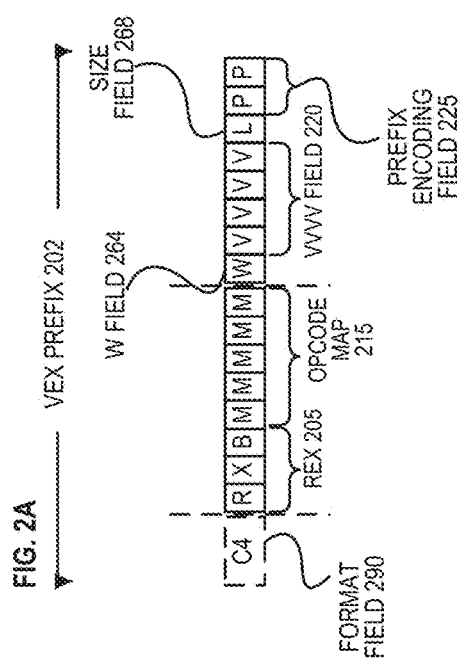
FIG. 2B
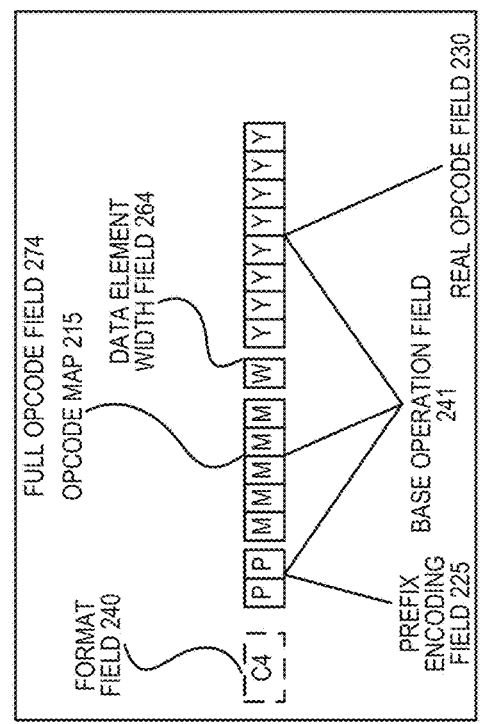
FIG. 2C

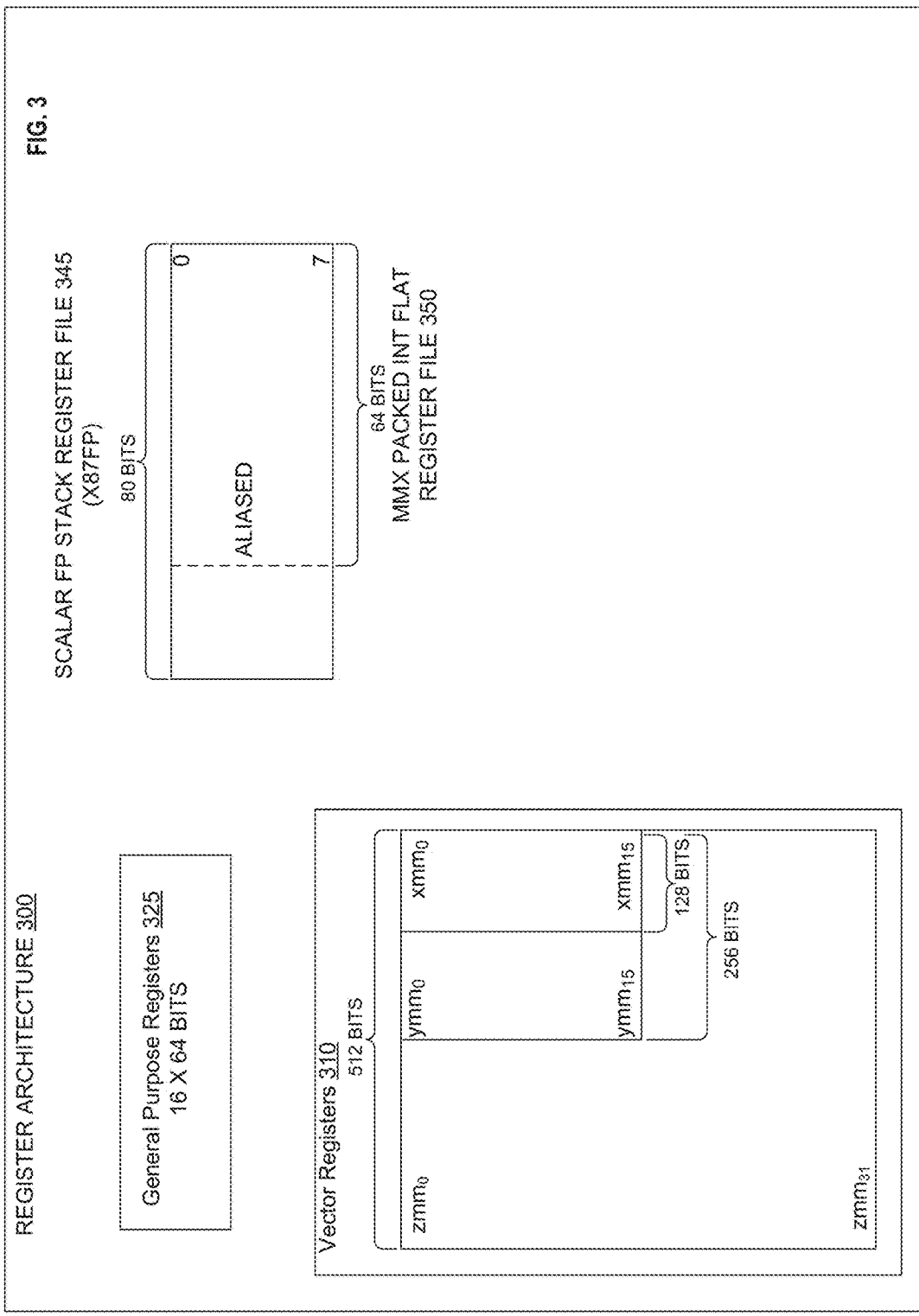

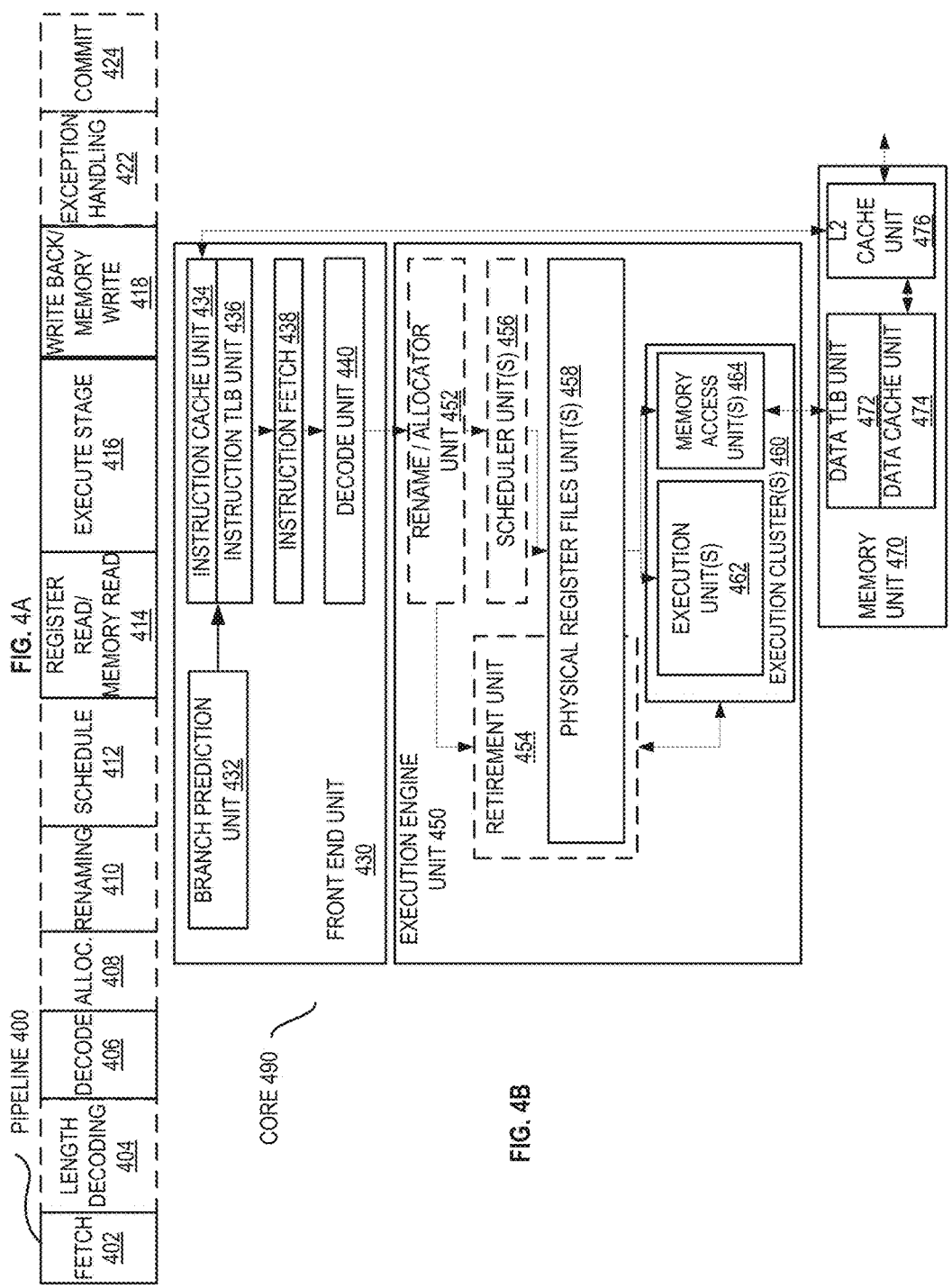

APPARATUS AND METHOD FOR MULTI-LEVEL CACHE REQUEST TRACKING

BACKGROUND

Field of the Invention

The embodiments of the invention relate generally to the field of computer processors. More particularly, the embodiments relate to an apparatus and method for multi-level cache request tracking.

Description of the Related Art

1. Processor Microarchitectures

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

2. Cache Synchronization

Modem microprocessors use a multi-level cache hierarchy. The cache size typically grows larger and the cache serves more hardware threads further up the hierarchy. Current processors have been using three levels of cache. The last level cache (LLC) in this hierarchy (also known as the Level-3 (L3) cache) services all the cores within the processor. The two lower levels of the cache, the L1 cache and the mid-level cache (MLC) (also known as the Level-2 (L2) cache), lie inside each core.

A "snoop filter" (SF), also known as a "tag-directory" or "tracker" is an on-die structure that tracks the presence of cache lines in the different levels of the cache hierarchy across the tiles on a die. The term "tiles" is used here to represent an agent that has a cache associated with it and accesses memory via an intra-die interconnection network. A tile, for example, can be associated with a single core, multiple cores, accelerators and/or I/O agents. Cache line tracking in the SF is done using presence bits, known as core-valid bits (CV bits), and helps maintain coherence for data streams and instruction streams across the caches. To reduce the area occupied by the SF, the tracking bits in each entry follow an encoded pattern. For every cached line up to two unique sharers of the line can be tracked perfectly, i.e., their exact identity is stored in the SF entry. If a cache line is shared by more than 2 caches however it is tracked in a coarse-grained manner with each CV bit used to represent multiple caches/tiles. As the number of tiles (and hence caches) on the die increase the level of coarse-grained encoding used for the CV bits has also been steadily increasing (from one bit representing 1 tile to one bit representing 6 or more tiles). This coarse-grained representation leads to CV bit aliasing whereby a core which never accesses a line can appear as currently caching it.

The CV bit aliasing outlined above can lead to the following inefficiencies in the coherence protocol. First, aliased CV bits can cause multiple spurious messages being sent out on the intra-die interconnect network leading to performance loss, extra network messages and energy usage. For example read-for-ownership requests and capacity evictions from the SF, which send invalidate messages based on the number of CV bits set in the SF, will send unnecessary invalidations to cores that never even cached the address and cause extra acknowledgement messages. Second, due to the aliased nature of CV bits for widely shared lines, evictions from the core caches are unable to clear the CV bit that represents them in the SF, leading to stale entries (i.e., entries which are no longer required but still have valid bits). In order to counter this problem certain processors provision the SF to be larger than the capacity of the on-die caches so that back-invalidations from the SF do not incur a performance loss.

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

FIG. 3 is a block diagram of a register architecture according to one embodiment of the invention; and FIG. 4A is a block diagram illustrating both an exemplary in-order fetch, decode, retire pipeline and an exemplary register renaming, out-of-order issue/execution pipeline according to embodiments of the invention;

FIG. 4B is a block diagram illustrating both an exemplary embodiment of an in-order fetch, decode, retire core and an exemplary register renaming, out-of-order issue/execution architecture core to be included in a processor according to embodiments of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1B:
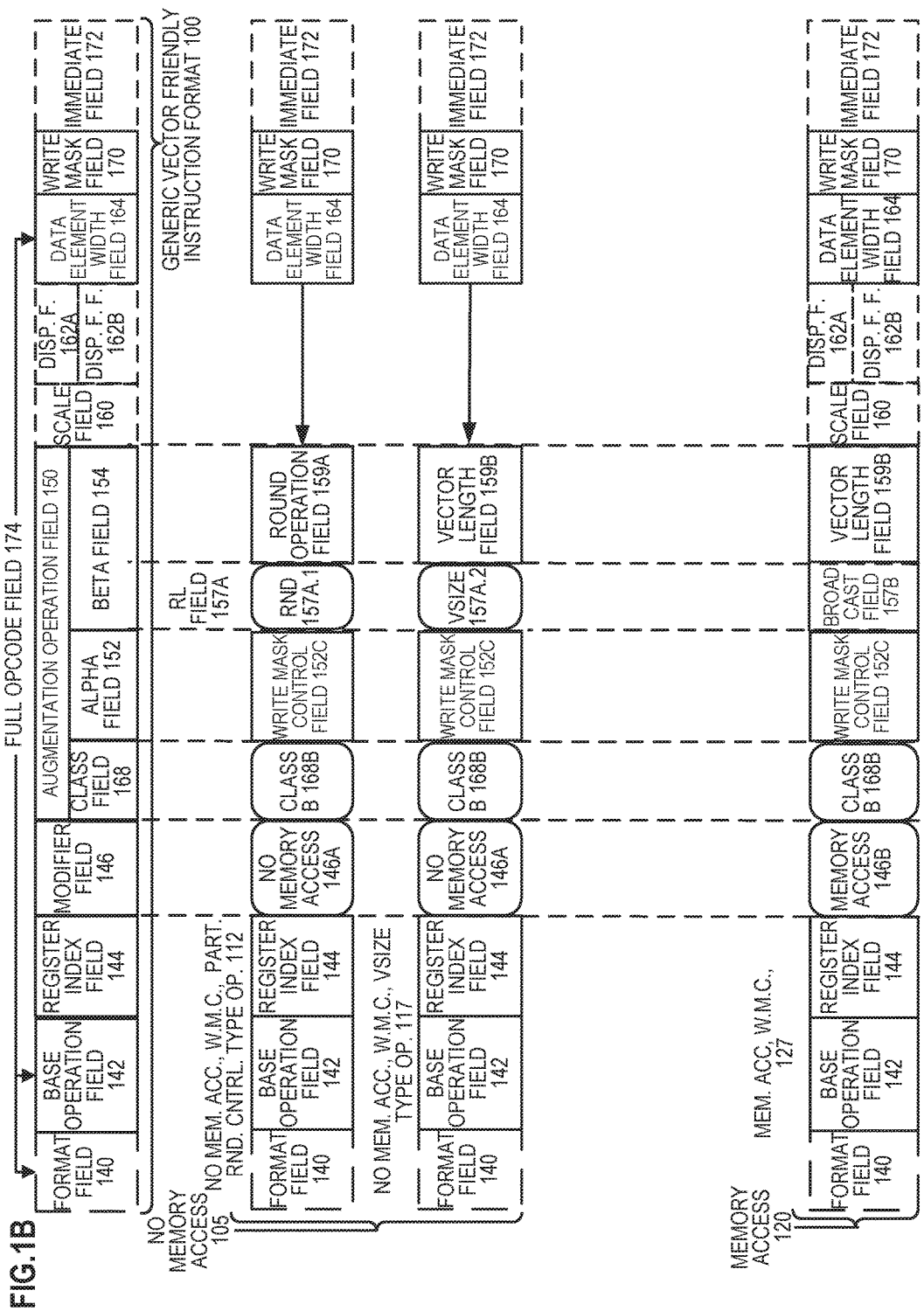

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations. Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses 2scale*index+base).

Displacement Field 162A—its content is used as part of memory address generation (e.g., for address generation that uses 2scale*index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]—mmmmm) includes content to encode an implied leading opcode byte. W Field 264 (VEX byte 2, bit [7]—W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1 s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 5B:
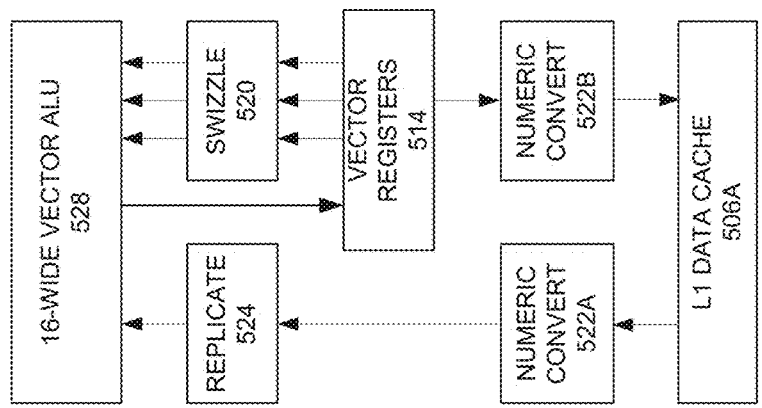
FIG. 5B illustrates an expanded view of part of the processor core in FIG. 5A according to embodiments of the invention.
Figure 5A:
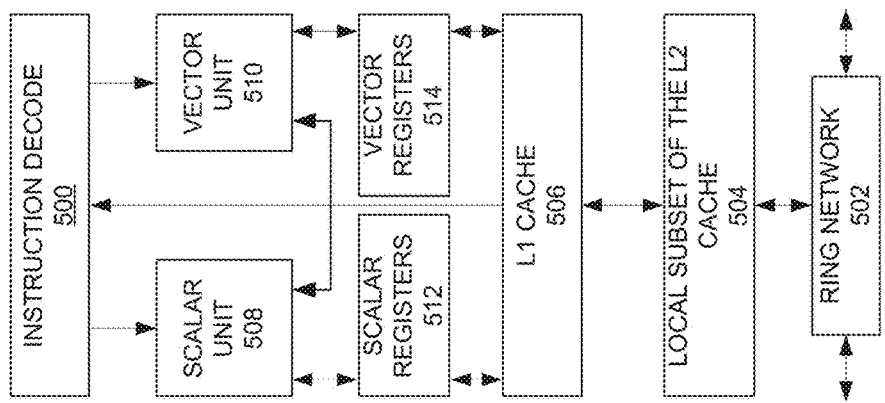
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
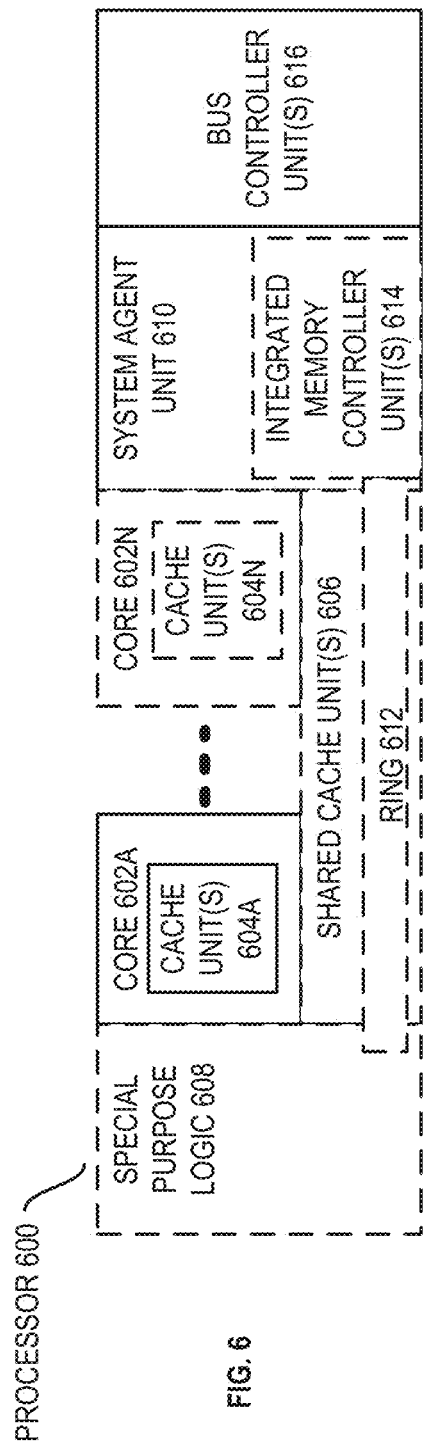
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
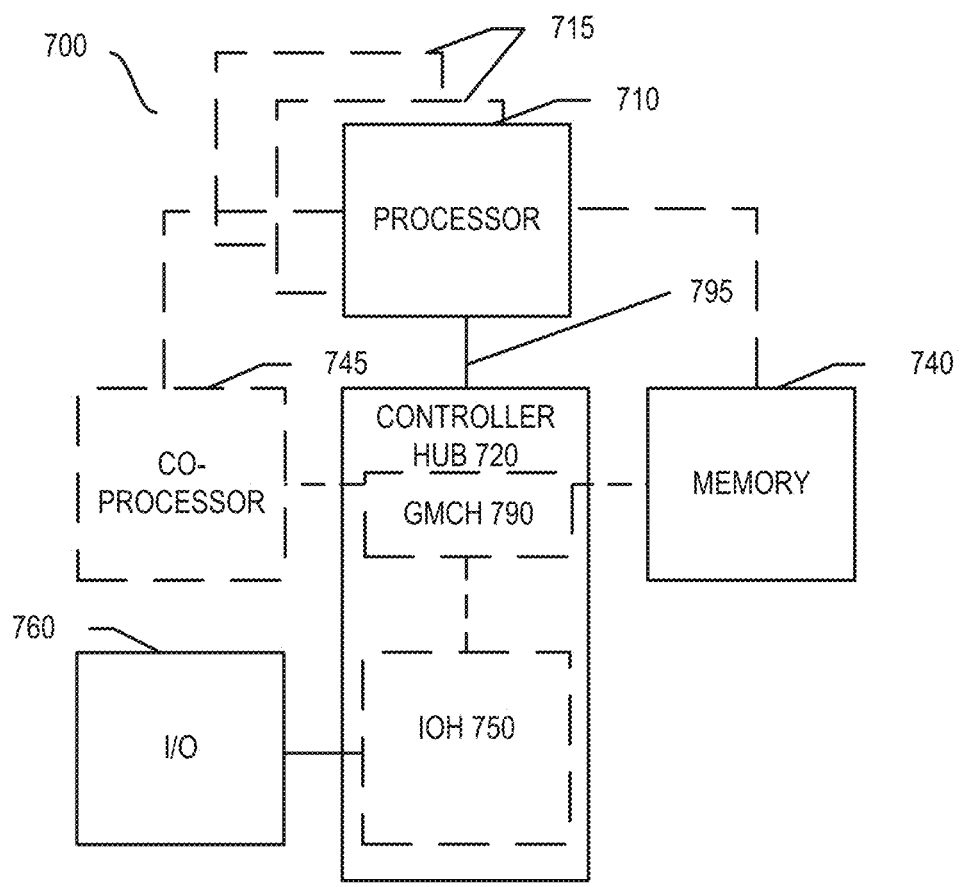
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
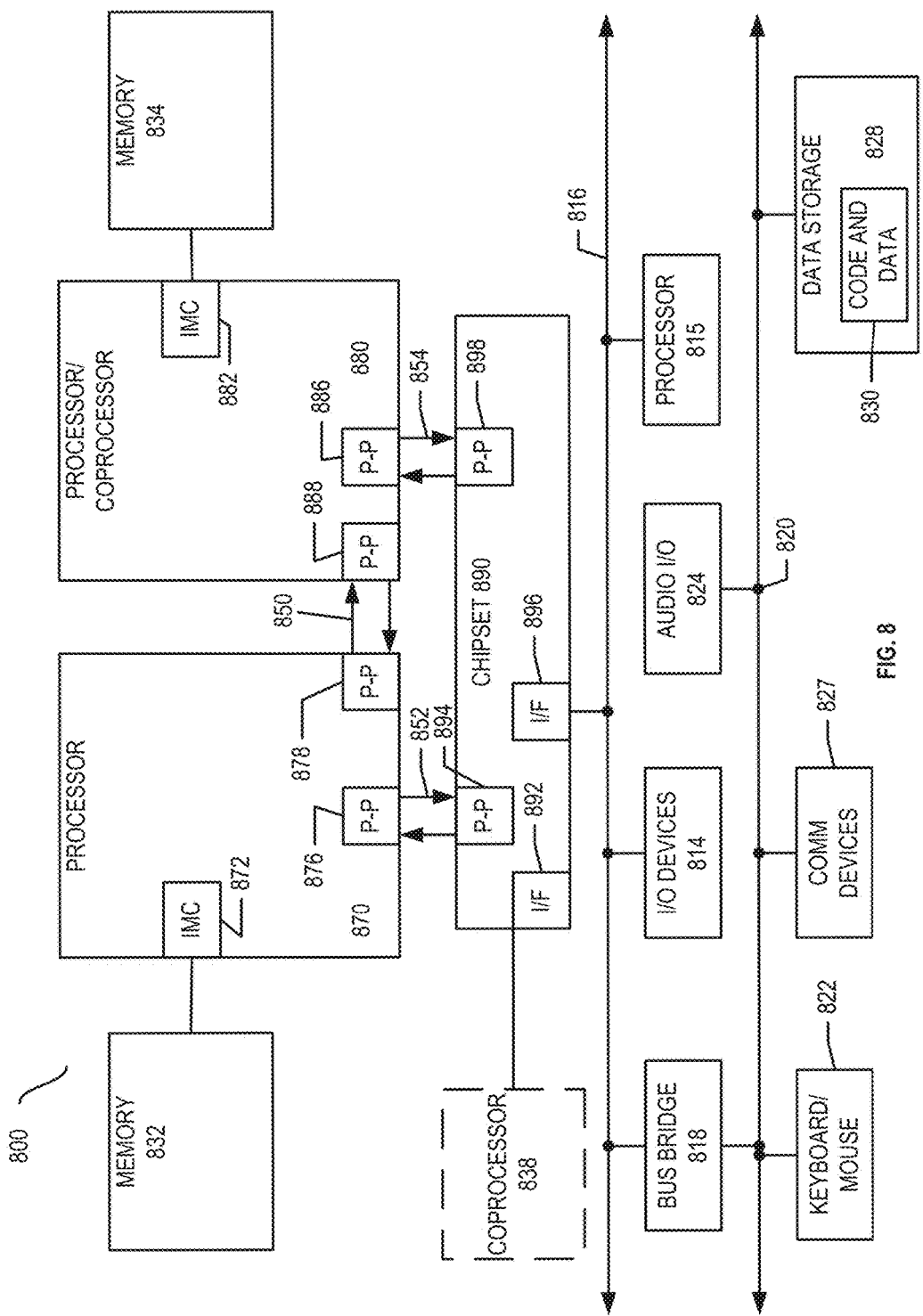
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
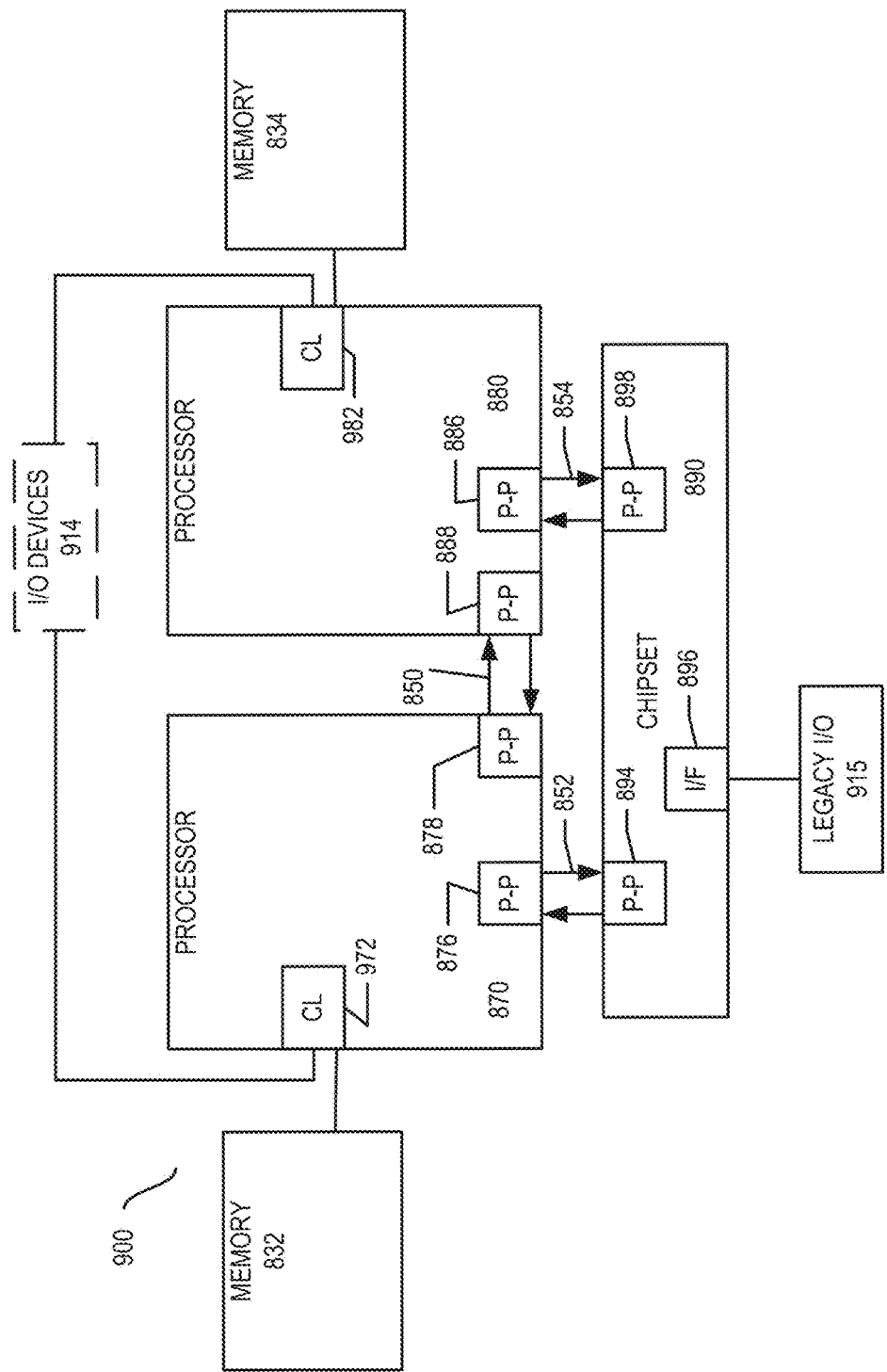
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
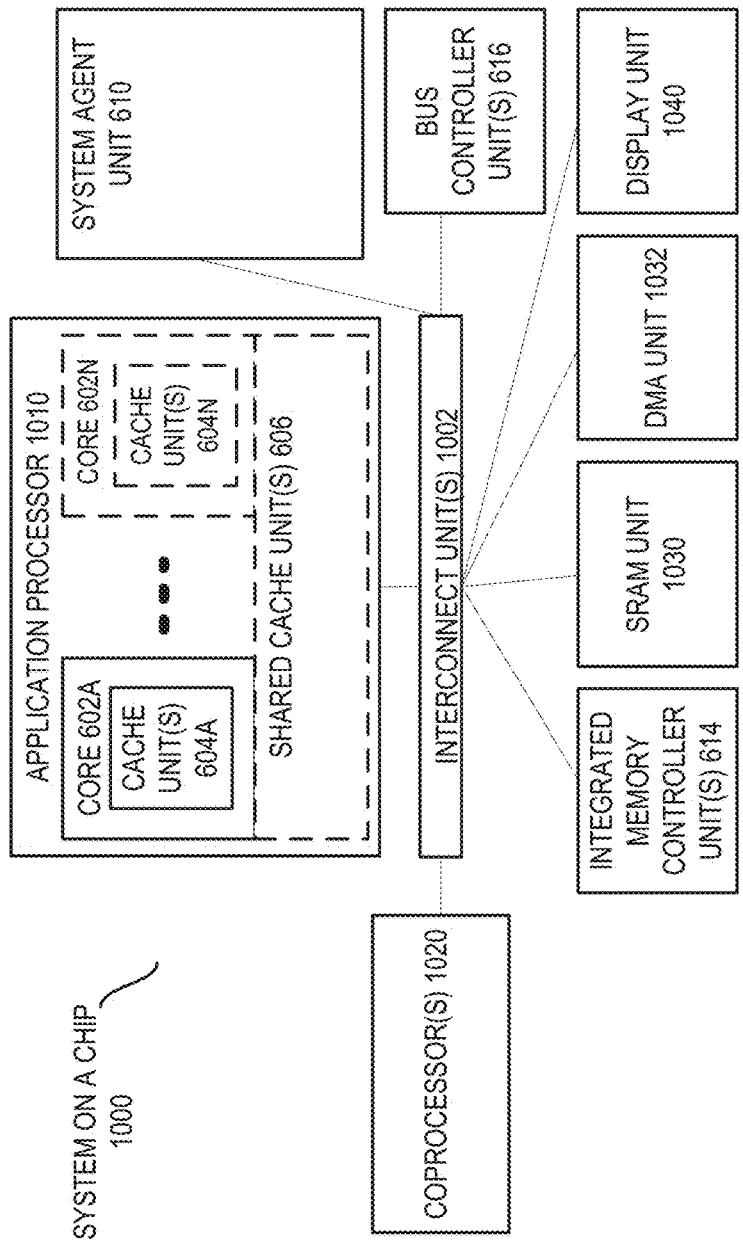
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
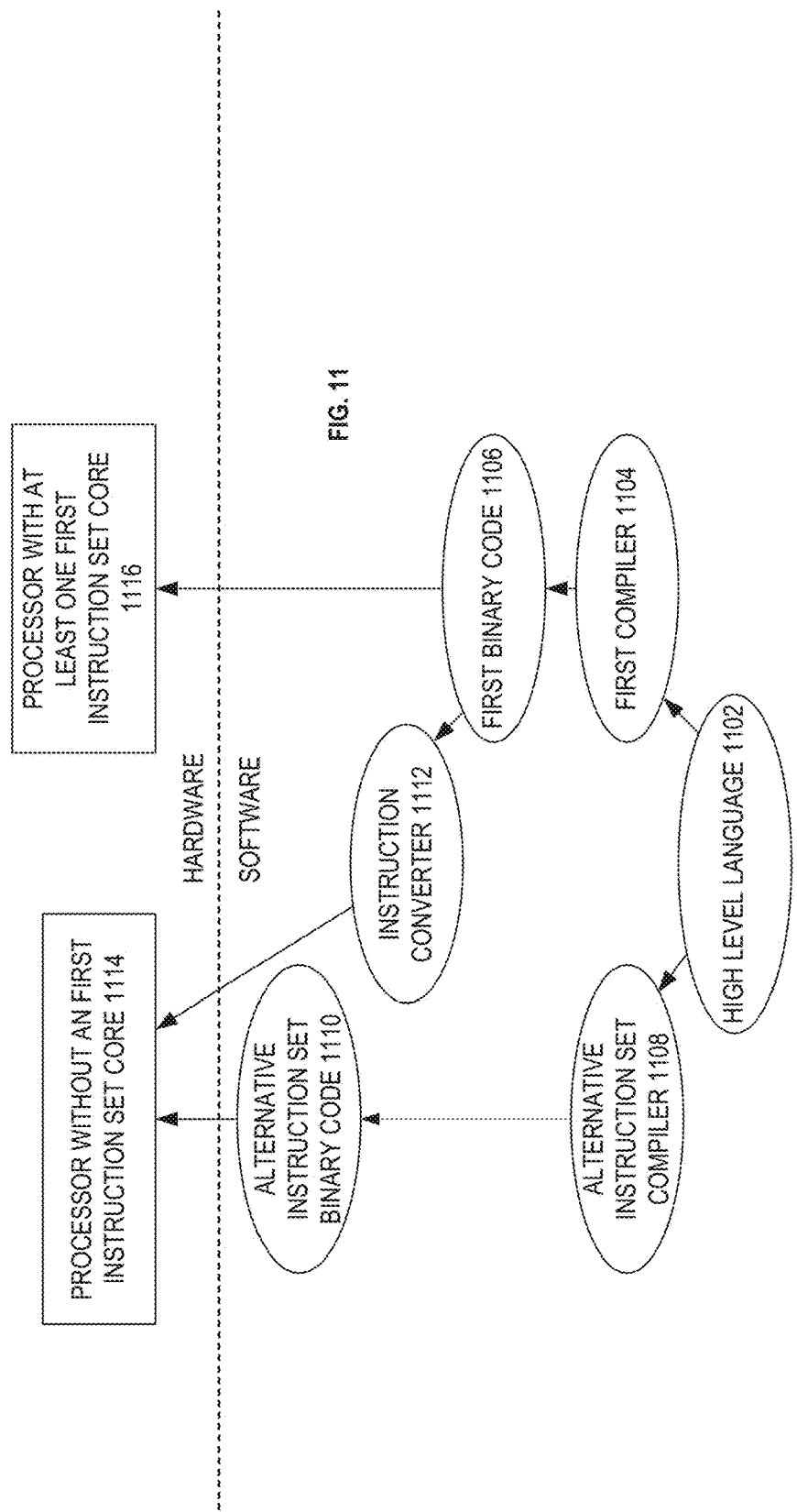
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Apparatus and Method for Multi-Level Cache Request Tracking

Various cache line tracking and coherency techniques are described below. This may be implemented within the context of the architectures described above. In one embodiment, the circuitry and logic to perform these operations is integrated within the execution engine unit 450 shown in FIG. 4B, within the memory unit 470, and/or the various caches such as cache units 604A-N and shared cache unit(s) 606 (see FIGS. 6 and 10). It should be noted, however, that the underlying principles of the invention are not limited to these specific architectures.

Modern microprocessors use multi-level cache hierarchies where the cache size grows larger and a cache level serves more hardware threads further up the hierarchy. Current processors have been using three levels of cache. The last level cache (LLC) in this hierarchy (also known as the Level-3 (L3) cache) services all the cores within the processor. The two lower levels of the cache, the L1 cache and the mid-level cache (MLC) (also known as the Level-2 (L2) cache), lie inside each core.

A "tracker" in one embodiment is an on-die structure that tracks memory transactions including the presence of cache lines in the different levels of the cache hierarchy across the various agents of the processor. An agent, for example, may be associated with a single core, multiple cores, accelerators and/or I/O devices. Cache line tracking is done using presence bits, known as core-valid bits or simply valid bits, and helps maintain coherence for data streams and instruction streams across the caches.

Figure 12:
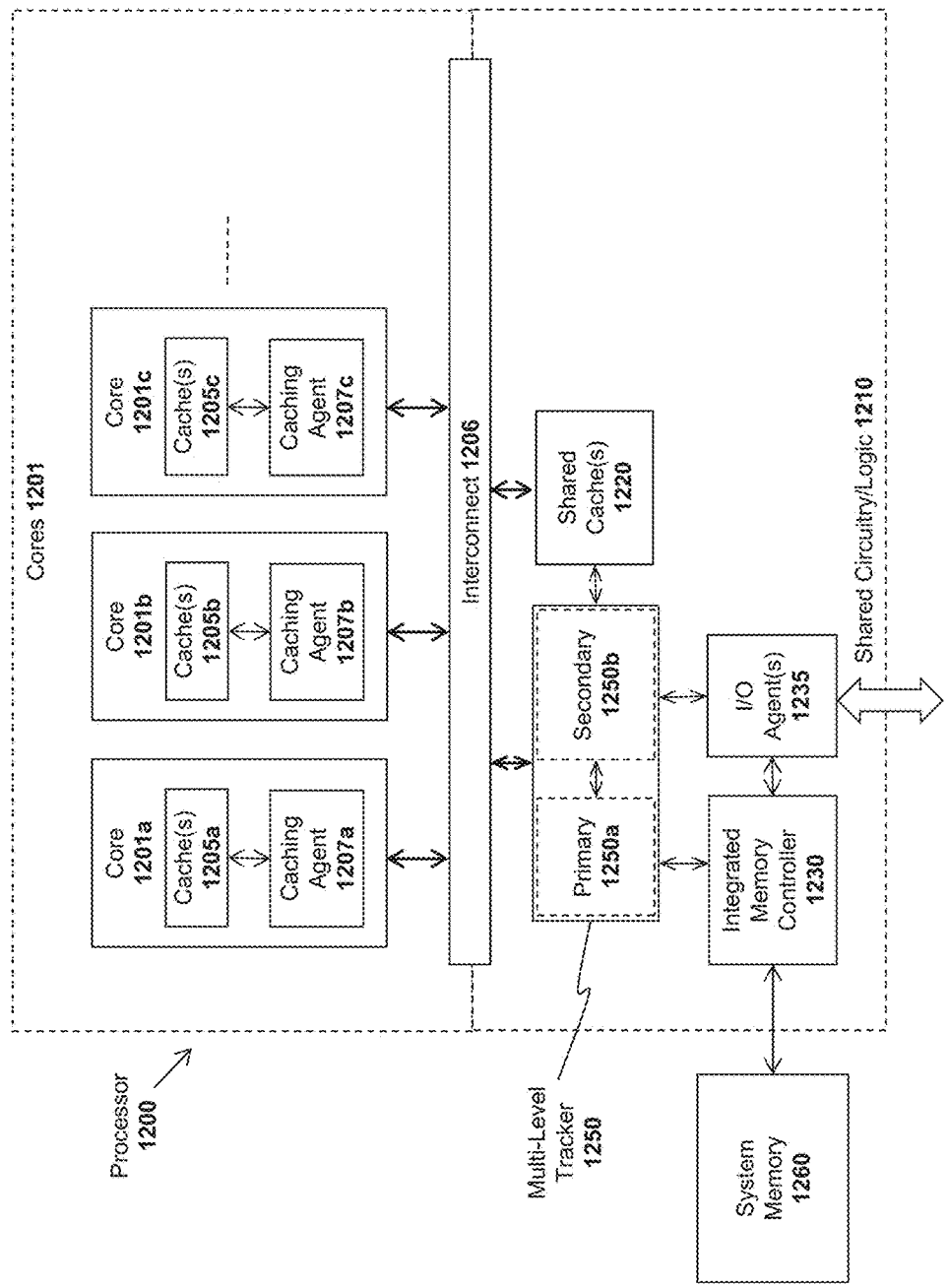
FIG. 12 illustrates a processor architecture on which embodiments of the invention may be implemented.

FIG. 12 illustrates an exemplary processor architecture on which the embodiments of the invention may be implemented which includes a core region 1201 and a shared circuitry/logic 1210 including data structures and circuitry shared by the cores 1201a-c. This shared circuitry region 1210 is sometimes referred to as the "uncore" region.

In the illustrated embodiment, the core region 1201 includes a plurality of cores 1201a-c, which may be multi-threaded cores capable of concurrently executing multiple instruction streams. Although only three cores 1201a-c are illustrated in FIG. 12, it will be appreciated that the core region 1201 may include any number of cores and/or other form of processing devices with a local cache (e.g., accelerators). Each of the cores 1201a-c may include well known instruction pipeline components for performing out-of-order or in-order execution of the instruction streams including an instruction fetch unit; a decode unit; an execution unit; a write-back/retirement unit; general purpose, vector, and mask registers; a branch prediction unit; a translation lookaside buffer (TLB); and various cache levels including a Level 1 (L1) cache, and Level 2 (L2) cache (illustrated generally as cache(s) 1205a-c). Note, however, that the underlying principles of the invention are not limited to any particular processor architecture.

In the illustrated embodiment, an interconnect 1206 such as a point-to-point interconnect communicatively couples the cores 1201a-c to one another and to various components within the shared circuitry/logic 1210 ("uncore") including shared cache(s) 1220 (e.g., a L3 cache), an integrated memory controller 1230 providing access to a system memory 1260, and one or more input/output (I/O) agents 1235 (e.g., such as a PCI express or similar agent interface).

In one embodiment, a multi-level tracker 1250 is coupled to the caching agents 1207a-c of the core caches 1205a-c, the shared cache(s) 1220, the I/O agent(s) 1235, and/or any other processor elements (not shown) adapted to coherently cache data/instructions on the processor 1200. In one embodiment, the multi-level tracker 1250 includes a primary tracker 1250a and a secondary tracker 1250b which operate together to efficiently track outstanding requests which miss in the cache hierarchy, as described below.

The number of outstanding requests pending from a coherent agent (e.g., core, IO device, graphics device, etc) can limit the maximum available bandwidth. One embodiment of the invention allows for scaling of outstanding requests that miss in the cache hierarchy without a significant impact to power and area. As a result, agents can see improved memory bandwidth.

In one embodiment, the primary tracker 1250a is a content-addressable memory (CAM) for tracking outstanding memory requests and the secondary tracker 1250b is implemented as a random access memory (RAM) such as a static RAM (SRAM). In this embodiment, the primary tracker 1250a is de-allocated for requests that miss in the cache hierarchy while the larger secondary tracker 1250b remains allocated until the requested data is returned from memory. One embodiment includes a CAM-based primary tracker 1250a which is backed up by a non-CAM secondary tracker 1250b. This arrangement mitigates the scalability problems associated with using a CAM for all elements in the tracker.

In particular, the address width in the CAM structure is indexed by the cache line address. Modern processors support up to 52 bit addresses which translate to 46 bits when the cache line is 64 bytes (Addr[51:6]). The CAM is necessary because of address matching requirements in the processor interface protocol. Matching all entries in the memory limits the scalability of the memory structure and adds significant power and latency compared to a simple SRAM arrangement. Consequently, CAM implementations are currently limited to a small number of entries (e.g., 32).

The bandwidth between a processor core and memory is limited by the number of outstanding requests specifically defined by the formula: Bandwidth=Number_outstanding_request*Request_size/average_request_latency. An example value would be 32 outstanding requests of a 64 B cache line with an average memory read latency of 150 ns. With 100% read traffic the resulting bandwidth is 13.7 GB/s (32*64 1B/150×10−9 sec). By allowing more outstanding requests the obtainable bandwidth can be grown linearly (ignoring other limitations in the path to memory).

The processor interface provides separate data and global-observation (GO) messages. A GO message is generated when cache coherence requirements of the cache line have been resolved. This may be known before data is returned to the core. In contemporary processor cores, a single tracking structure is maintained until both data and the GO messages are received by the core. This structure also provides a full cache line of storage to hold a cache line of data.

In one embodiment of the invention, request tracking is broken into separate structures with the primary CAM-based tracker 1250a remaining allocated only during the global observation phase. In one embodiment, the secondary tracker structure 1250b is an SRAM and provides state storage and mapping of the data into a cache. Direct-to-MLC routing of data removes the storage for the cache line of data in the contemporary tracking structure.

One benefit of this embodiment is that it allows approximately 10 times the number of outstanding requests to memory with about the same level of storage elements and without growing the depth of the CAM 1250a, meaning that there is no significant change in the per-request power or latency. The result is up to a 10× bandwidth improvement.

In addition, a new data flow control structure is included in one embodiment that is implemented in the system interface to the processor. This flow control buffer allows for temporal stalls in data delivery into the cache and the processor's fill buffer.

Figure 13:
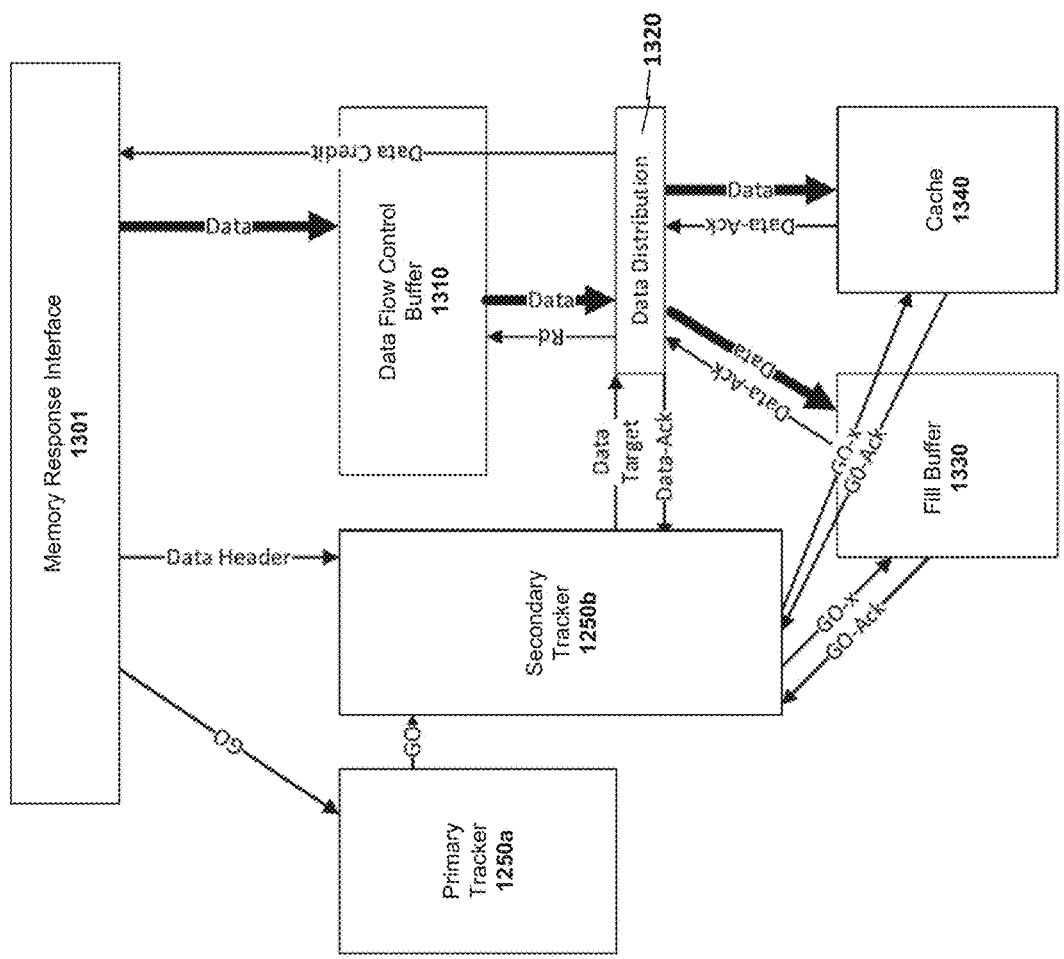
FIG. 13 illustrates an architecture in accordance with one embodiment of the invention.

FIG. 13 illustrates one embodiment in which a global observation (GO) portion of a memory response from the memory response interface 1301 is allocated to the primary tracker 1250a. In one embodiment, the primary tracker 1250a is a 32-entry CAM-based tracker. Header data providing a mapping to the underlying response data is concurrently written to the secondary state tracker 1250b. In one implementation, the secondary state tracker 1250b is a 256-entry SRAM; however, the underlying principles of the invention are not limited to any particular secondary tracker size or memory type. In one embodiment, a data flow control buffer 1310 (e.g., a 16-entry data flow control FIFO) in one embodiment, stores entire cache lines of data. In one embodiment, a cache line comprises 64 bytes in length; however, various different cache line sizes may be used.

In one embodiment, a data distribution circuit 1320 reads cache lines from the data flow control FIFO 1310. A credit-based implementation may be used in which each data distribution circuit 1320 is allocated a certain amount of credit for data communication. Once the credit has been used up, the data distribution circuit 1320 waits to be allocated more credit and/or for one or more other components to complete its allocated set of data transactions.

A multi-entry fill buffer 1330 employed in one embodiment accumulates portions of the cache line from one or more other levels of the memory hierarchy. Once a particular entry is filled, it is transferred from the fill buffer to the cache 1340 along with a tag usable to identify the cache line in response to a subsequent memory request.

In one embodiment, once a GO message is generated indicating that the cache coherence requirements of the cache line have been resolved, the entry for the cache line can be deallocated from the primary tracker 1350a which may notify the secondary tracker 1250b. In addition, the secondary tracker 1250b may transmit the GO message to the cache fill buffer 1330 and/or the cache 1340, which may responsively transmit an acknowledgement message, as illustrated. Consequently, any delay in storing the cache line (data+tag) in the cache 1340 does not prevent the entry from being deallocated in the primary tracker, freeing the entry for another memory transaction.

In one embodiment, once the data is successfully stored in the cache 1340, the data distribution circuit 1320 and/or the cache 1340 provides an acknowledgement to the secondary tracker 1250, which responsively deallocates one or more entries as described herein.

Figure 14:
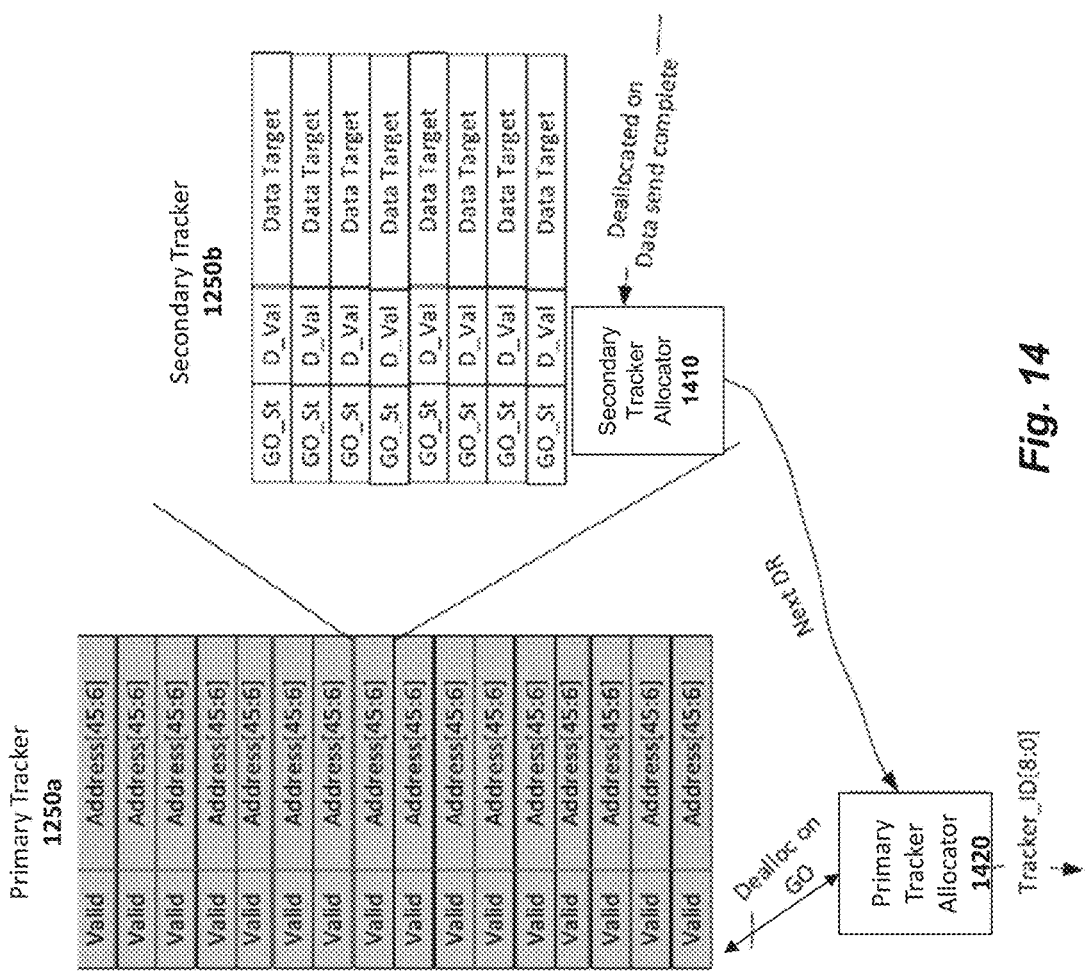
FIG. 14 illustrates an exemplary primary tracker and secondary tracker employed in one embodiment of the invention.

FIG. 14 illustrates how an allocation policy may be implemented between a primary tracker 1250a and a secondary tracker 1250b. In one embodiment a primary tracker allocator 1420 (sometimes referred to as primary allocation tracker circuitry) allocates a Tracker Identifier (TID or Tracker_ID)) for each entry in the primary tracker 1250a. The TID may be a subset of the bits that index the primary tracker. In one embodiment, the complete TID (upper and lower bits) indicate the secondary tracker 1250b which may be directly indexed to update state in response to GO and Data messages. In one embodiment, the secondary tracker 1250b must have an equal or larger number of entries than the primary tracker 1250a. In the illustrated example, the secondary tracker 1250b includes 8 secondary entries allocated by a secondary tracker allocator 1410 (or secondary tracker allocation circuitry) for every entry in the primary tracker 1250a.

In one embodiment, each entry in the secondary tracker 1250b includes a current global observation (GO) state (GO_St) which identifies the current stage for the GO transaction, a valid bit (D_Val) indicating whether the associated cache line is valid, and a data target value which points to the underlying data being transferred to the cache.

As mentioned, in one embodiment, the primary allocator 1420 deallocates the entry in the primary tracker 1250a in response to receipt of a GO message indicating that cache coherence requirements of the cache line have been resolved. The secondary tracker 1250 may continue to store an entry associated with the cache line, but may update its GO state to the GO message (e.g., to a "completed" state). The secondary tracker allocator 1410 then deallocates the line in response to a message indicating that the transfer of the cache line is complete, thereby freeing the associated entry. The end result is that the primary tracker 1250*a* is updated more efficiently than in existing architectures which require both a GO message and a data complete message before deallocating the primary tracker 1250*a*.

Figure 15:
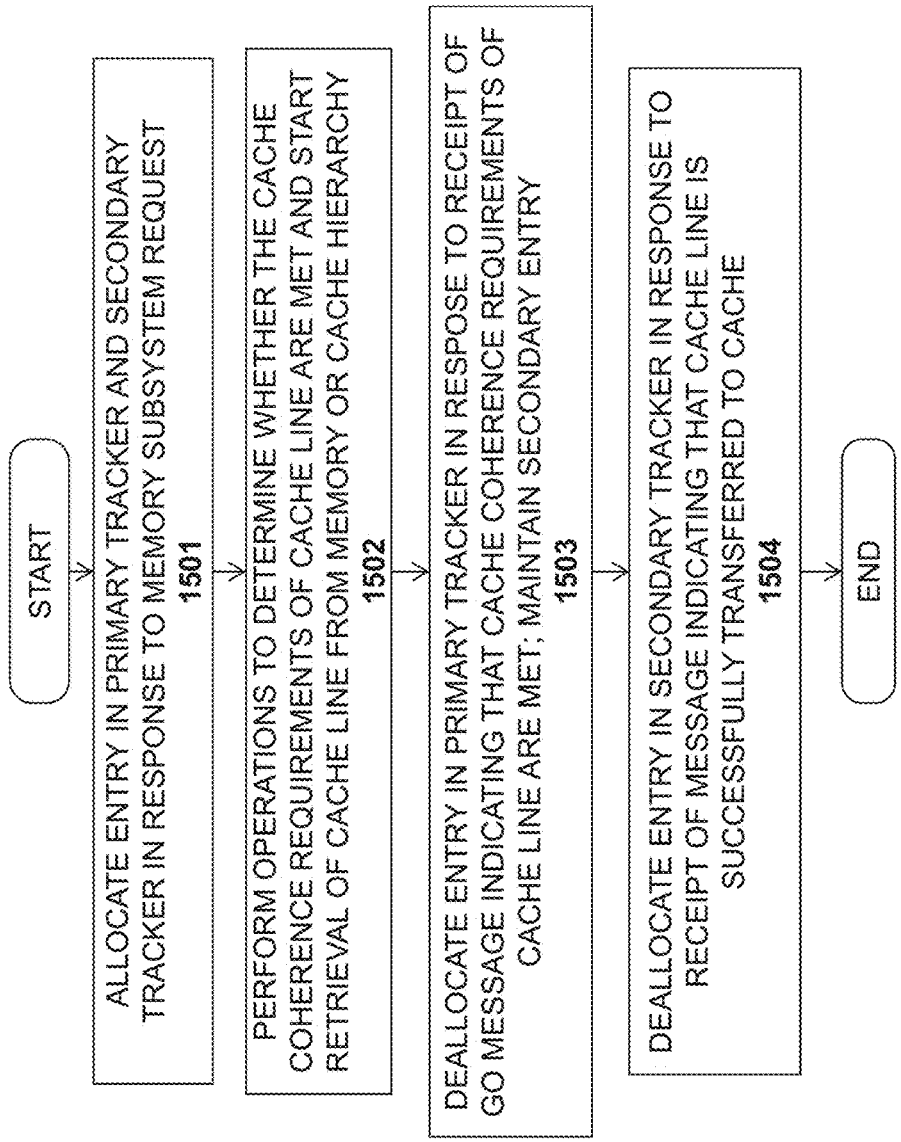
FIG. 15 illustrates a method in accordance with one embodiment of the invention.

A method in accordance with one embodiment is illustrated in FIG. 15. The method may be implemented within the context of the various architectures described above, but is not limited to any particular architecture.

At 1501, new entries are allocated in a primary tracker and a secondary tracker in response to a memory subsystem request generated by a processor agent (e.g., a core, I/O device, etc). At 1502, a determination is made (e.g., via cache coherency mechanisms) to determine whether the cache coherence requirements of the requested cache line are met and the process of retrieving the cache line from memory or the cache hierarchy is initiated. At 1503, the entry is deallocated from the primary tracker in response to a receipt of a GO message indicating that the cache coherence requirements of the cache line are met. As discussed above, the corresponding entry may be maintained in the secondary tracker until the cache line has been successfully transferred. At 1504, the entry is deallocated from the secondary tracker in response to an indication that the cache line has been successfully transferred to the cache.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Components, features, and details described for any of the apparatus may also optionally apply to any of the methods, which in embodiments may be performed by and/or with such apparatus. Any of the processors described herein may be included in any of the systems disclosed herein. In some embodiments, the computer system may include an interconnect, a processor coupled with the interconnect, and a dynamic random access memory (DRAM) coupled with the interconnect. Alternatively, instead of DRAM, other types of volatile memory that don't need to be refreshed may be used, or flash memory may be used.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 includes a processor or other apparatus comprising: one or more cores to execute instructions and process data; a memory subsystem comprising a system memory and a multi-level cache hierarchy; a primary tracker to store a first entry associated with a memory request to transfer a cache line from the system memory or a first cache within the cache hierarchy to a second cache; primary tracker allocation circuitry to allocate and deallocate entries within the primary tracker; a secondary tracker to store a second entry associated with the memory request; secondary tracker allocation circuitry to allocate and deallocate entries within the secondary tracker; the primary tracker allocation circuitry to deallocate the first entry in response to a first indication that one or more cache coherence requirements associated with the cache line have been resolved, the secondary tracker allocation circuitry to deallocate the second entry in response to a second indication related to transmission of the cache line to the second cache.

Example 2 comprises the processor of Example 1 wherein the second indication comprises an indication that the cache line has been successfully transmitted to the second cache.

Example 3 comprises the processor of Example 1 wherein the first indication that one or more cache coherence requirements associated with the cache line have been resolved comprises an indication that the cache line is coherent as determined by cache coherence circuitry of the processor.

Example 4 comprises the processor of Example 1 further comprising:

a fill buffer into which the cache line is to be written by data distribution circuitry of the processor, the cache line to be transferred to the second cache after being written into the fill buffer.

Example 5 comprises the processor of Example 4 wherein the second cache comprises a mid-level cache (MLC).

Example 6 comprises the processor of Example 1 wherein the primary tracker comprises a content addressable memory (CAM).

Example 7 comprises the processor of Example 1 wherein the secondary tracker comprises a static random access memory (SRAM).

Example 8 comprises the processor of Example 1 wherein the primary tracker allocation circuitry is to allocate the first entry in response to detecting the memory request to transfer a cache line from the system memory or a first cache within the cache hierarchy to the second cache.

Example 9 comprises the processor of Example 8 wherein the first entry comprises a valid indication and a portion of an address associated with the memory request.

Example 10 comprises the processor of Example 9 wherein the second entry comprises data identifying a location within the second cache into which the cache line is to be copied.

Example 11 comprises the processor of Example 1 wherein the second entry is retained when the first entry has been deallocated.

Example 12. A method comprising:

allocating a first entry in a primary tracker of a processor in response to a memory request to transfer a cache line from a system memory or a first cache within a cache hierarchy to a second cache;

allocating a second entry in a secondary tracker of the processor, the second entry to be associated with the memory request;

deallocating the first entry in response to a first indication that one or more cache coherence requirements associated with the cache line have been resolved; and deallocating the second entry in response to a second indication related to transmission of the cache line to the second cache.

Example 13 comprises the method of Example 12 wherein the second indication comprises an indication that the cache line has been successfully transmitted to the second cache.

Example 14 comprises the method of Example 12 wherein the first indication that one or more cache coherence requirements associated with the cache line have been resolved comprises an indication that the cache line is coherent as determined by cache coherence circuitry of the processor.

Example 15 comprises the method of Example 12 further comprising:

writing the cache line to a fill buffer; and transferring the cache line to the second cache after being written into the fill buffer.

Example 16 comprises the method of Example 15 wherein the second cache comprises a mid-level cache (MLC).

Example 17 comprises the method of Example 12 wherein the primary tracker comprises a content addressable memory (CAM).

Example 18 comprises the method of Example 12 wherein the secondary tracker comprises a static random access memory (SRAM).

Example 19 comprises the method of Example 12 wherein the primary tracker allocation circuitry is to allocate the first entry in response to detecting the memory request to transfer a cache line from the system memory or a first cache within the cache hierarchy to the second cache.

Example 20 comprises the method of Example 19 wherein the first entry comprises a valid indication and a portion of an address associated with the memory request.

Example 21 comprises the method of Example 20 wherein the second entry comprises data identifying a location within the second cache into which the cache line is to be copied.

Example 22 comprises the method of Example 12 wherein the second entry is retained when the first entry has been deallocated.

Example 23. A machine-readable medium having program code stored therein which, when executed by a machine, causes the machine to perform the operations of:

allocating a first entry in a primary tracker of a processor in response to a memory request to transfer a cache line from a system memory or a first cache within a cache hierarchy to a second cache;

allocating a second entry in a secondary tracker of the processor, the second entry to be associated with the memory request;

deallocating the first entry in response to a first indication that one or more cache coherence requirements associated with the cache line have been resolved; and deallocating the second entry in response to a second indication related to transmission of the cache line to the second cache.

Example 24 comprises the machine-readable medium of Example 23 wherein the second indication comprises an indication that the cache line has been successfully transmitted to the second cache.

Example 25 comprises the machine-readable medium of Example 23 wherein the first indication that one or more cache coherence requirements associated with the cache line have been resolved comprises an indication that the cache line is coherent as determined by cache coherence circuitry of the processor.

Example 26 comprises the machine-readable medium of Example 23 further comprising program code to cause the machine to perform the operations of:

writing the cache line to a fill buffer; and transferring the cache line to the second cache after being written into the fill buffer.

Example 27 comprises the machine-readable medium of Example 26 wherein the second cache comprises a mid-level cache (MLC).

Example 28 comprises the machine-readable medium of Example 23 wherein the primary tracker comprises a content addressable memory (CAM).

Example 29 comprises the machine-readable medium of Example 23 wherein the secondary tracker comprises a static random access memory (SRAM).

Example 30 comprises the machine-readable medium of Example 23 wherein the primary tracker allocation circuitry is to allocate the first entry in response to detecting the memory request to transfer a cache line from the system memory or a first cache within the cache hierarchy to the second cache.

Example 31 comprises the machine-readable medium of Example 30 wherein the first entry comprises a valid indication and a portion of an address associated with the memory request.

Example 32 comprises the machine-readable medium of Example 31 wherein the second entry comprises data identifying a location within the second cache into which the cache line is to be copied.

Example 33 comprises the machine-readable medium of Example 23 wherein the second entry is retained when the first entry has been deallocated.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:

one or more cores to execute instructions and process data;

a memory subsystem comprising a system memory and a multi-level cache hierarchy;

a primary tracker to store a first entry associated with a memory request to transfer a cache line from the system memory or a first cache within the cache hierarchy to a second cache;

primary tracker allocation circuitry to allocate and deallocate entries within the primary tracker;

a secondary tracker to store a second entry associated with the memory request;

secondary tracker allocation circuitry to allocate and deallocate entries within the secondary tracker;

the primary tracker allocation circuitry to deallocate the first entry in response to a first indication that one or more cache coherence requirements associated with the cache line have been resolved, the secondary tracker allocation circuitry to deallocate the second entry in response to a second indication related to transmission of the cache line to the second cache.

2. The processor of claim 1 wherein the second indication comprises an indication that the cache line has been successfully transmitted to the second cache.

3. The processor of claim 1 wherein the first indication that one or more cache coherence requirements associated with the cache line have been resolved comprises an indication that the cache line is coherent as determined by cache coherence circuitry of the processor.

4. The processor of claim 1 further comprising:
a fill buffer into which the cache line is to be written by data distribution circuitry of the processor, the cache line to be transferred to the second cache after being written into the fill buffer.

5. The processor of claim 4 wherein the second cache comprises a mid-level cache (MLC).

6. The processor of claim 1 wherein the primary tracker comprises a content addressable memory (CAM).

7. The processor of claim 1 wherein the secondary tracker comprises a static random access memory (SRAM).

8. The processor of claim 1 wherein the primary tracker allocation circuitry is to allocate the first entry in response to detecting the memory request to transfer a cache line from the system memory or a first cache within the cache hierarchy to the second cache.

9. The processor of claim 8 wherein the first entry comprises a valid indication and a portion of an address associated with the memory request.

10. The processor of claim 9 wherein the second entry comprises data identifying a location within the second cache into which the cache line is to be copied.

11. The processor of claim 1 wherein the second entry is retained when the first entry has been deallocated.

12. A method comprising:
allocating a first entry in a primary tracker of a processor in response to a memory request to transfer a cache line from a system memory or a first cache within a cache hierarchy to a second cache;
allocating a second entry in a secondary tracker of the processor, the second entry to be associated with the memory request;
deallocating the first entry in response to a first indication that one or more cache coherence requirements associated with the cache line have been resolved; and
deallocating the second entry in response to a second indication related to transmission of the cache line to the second cache.

13. The method of claim 12 wherein the second indication comprises an indication that the cache line has been successfully transmitted to the second cache.

14. The method of claim 12 wherein the first indication that one or more cache coherence requirements associated with the cache line have been resolved comprises an indication that the cache line is coherent as determined by cache coherence circuitry of the processor.

15. The method of claim 12 further comprising:
writing the cache line to a fill buffer; and
transferring the cache line to the second cache after being written into the fill buffer.

16. The method of claim 15 wherein the second cache comprises a mid-level cache (MLC).

17. The method of claim 12 wherein the primary tracker comprises a content addressable memory (CAM).

18. The method of claim 12 wherein the secondary tracker comprises a static random access memory (SRAM).

19. The method of claim 12 wherein the primary tracker allocation circuitry is to allocate the first entry in response to detecting the memory request to transfer a cache line from the system memory or a first cache within the cache hierarchy to the second cache.

20. A non-transitory machine-readable medium having program code stored therein which, when executed by a machine, causes the machine to perform the operations of:
allocating a first entry in a primary tracker of a processor in response to a memory request to transfer a cache line from a system memory or a first cache within a cache hierarchy to a second cache;
allocating a second entry in a secondary tracker of the processor, the second entry to be associated with the memory request;
deallocating the first entry in response to a first indication that one or more cache coherence requirements associated with the cache line have been resolved; and
deallocating the second entry in response to a second indication related to transmission of the cache line to the second cache.

* * * * *